(12) United States Patent
Lee

(10) Patent No.: US 9,068,513 B2
(45) Date of Patent: Jun. 30, 2015

(54) SEAL ASSEMBLY INCLUDING GROOVES IN AN INNER SHROUD IN A GAS TURBINE ENGINE

(71) Applicant: Ching-Pang Lee, Cincinnati, OH (US)

(72) Inventor: Ching-Pang Lee, Cincinnati, OH (US)

(73) Assignee: Siemens Aktiengesellschaft, Munich (DE)

(*) Notice: Subject to any disclaimer, the term of this patent is extended or adjusted under 35 U.S.C. 154(b) by 280 days.

(21) Appl. No.: 13/747,868

(22) Filed: Jan. 23, 2013

(65) Prior Publication Data

US 2014/0286760 A1   Sep. 25, 2014

(51) Int. Cl.
| | |
|---|---|
| *F04D 31/00* | (2006.01) |
| *F02C 7/28* | (2006.01) |
| *F01D 5/08* | (2006.01) |
| *F01D 11/00* | (2006.01) |
| *F01D 11/04* | (2006.01) |

(52) U.S. Cl.
CPC . *F02C 7/28* (2013.01); *F01D 5/082* (2013.01); *F01D 11/001* (2013.01); *F01D 11/04* (2013.01); *F05D 2250/71* (2013.01)

(58) Field of Classification Search
CPC ....... F01D 11/00; F01D 11/001; F01D 11/02; F01D 11/005; F01D 11/008; F01D 4/06
USPC .............. 415/115–116, 182.1, 183, 185, 191; 416/193 A
See application file for complete search history.

(56) References Cited

U.S. PATENT DOCUMENTS

| | | | |
|---|---|---|---|
| 6,077,035 | A | 6/2000 | Walters et al. |
| 6,152,690 | A | 11/2000 | Tomita et al. |
| 6,887,039 | B2 | 5/2005 | Soechting et al. |
| 7,114,339 | B2 * | 10/2006 | Alvanos et al. ................. 60/806 |
| 7,189,055 | B2 | 3/2007 | Marini et al. |
| 7,244,104 | B2 | 7/2007 | Girgis et al. |
| 8,075,256 | B2 | 12/2011 | Little |
| 2010/0074734 | A1 | 3/2010 | Little |
| 2010/0119364 | A1 | 5/2010 | Bunker |

FOREIGN PATENT DOCUMENTS

EP             1582697 A1    10/2005

* cited by examiner

*Primary Examiner* — Edward Look
*Assistant Examiner* — Christopher J Hargitt

(57) ABSTRACT

A seal assembly between a disc cavity and a hot gas path in a gas turbine engine includes a rotating blade assembly having a plurality of blades that rotate with a turbine rotor during operation of the engine, and a stationary vane assembly having a plurality of vanes and an inner shroud. The inner shroud includes a radially outwardly facing first surface, a radially inwardly facing second surface, and a plurality of grooves extending into the second surface. The grooves are arranged such that a space having a component in a circumferential direction is defined between adjacent grooves. During operation of the engine, the grooves guide purge air out of the disc cavity toward the hot gas path such that the purge air flows in a desired direction with reference to a direction of hot gas flow through the hot gas path.

18 Claims, 4 Drawing Sheets

SEAL ASSEMBLY INCLUDING GROOVES IN AN INNER SHROUD IN A GAS TURBINE ENGINE

FIELD OF THE INVENTION

The present invention relates generally to a seal assembly for use in a gas turbine engine that includes a plurality of grooves located on a radially inner side of an inner shroud for assisting in limiting leakage between a hot gas path and a disc cavity.

BACKGROUND OF THE INVENTION

In multistage rotary machines such as gas turbine engines, a fluid, e.g., intake air, is compressed in a compressor section and mixed with a fuel in a combustion section. The mixture of air and fuel is ignited in the combustion section to create combustion gases that define a hot working gas that is directed to turbine stage(s) within a turbine section of the engine to produce rotational motion of turbine components. Both the turbine section and the compressor section have stationary or non-rotating components, such as vanes, for example, that cooperate with rotatable components, such as blades, for example, for compressing and expanding the hot working gas. Many components within the machines must be cooled by a cooling fluid to prevent the components from overheating.

Ingestion of hot working gas from a hot gas path to disc cavities in the machines that contain cooling fluid reduces engine performance and efficiency, e.g., by yielding higher disc and blade root temperatures. Ingestion of the working gas from the hot gas path to the disc cavities may also reduce service life and/or cause failure of the components in and around the disc cavities.

SUMMARY OF THE INVENTION

In accordance with a first aspect of the invention, a seal assembly is provided between a disc cavity and a hot gas path that extends through a turbine section of a gas turbine engine. The seal assembly comprises a rotating blade assembly including a plurality of blades that rotate with a turbine rotor during operation of the engine, and a stationary vane assembly including a plurality of vanes and an inner shroud. The inner shroud comprises a radially outwardly facing first surface, a radially inwardly facing second surface, and a plurality of grooves extending into the second surface. The grooves are arranged such that a space having a component in a circumferential direction is defined between adjacent grooves. During operation of the engine, the grooves guide purge air out of the disc cavity toward the hot gas path such that the purge air flows in a desired direction with reference to a direction of hot gas flow through the hot gas path.

In accordance with a second aspect of the invention, a seal assembly is provided between a disc cavity and a hot gas path that extends through a turbine section of a gas turbine engine. The seal assembly comprises a rotating blade assembly including a plurality of blades that rotate with a turbine rotor during operation of the engine, and a stationary vane assembly including a plurality of vanes and an inner shroud. The inner shroud comprises a radially outwardly facing first surface that extends to an axial end portion of the inner shroud, a second surface that extends from the axial end portion of the inner shroud away from the blade assembly and faces radially inwardly and axially, a generally axially facing third surface that extends radially inwardly from the second surface and faces the blade assembly, and a plurality of grooves extending into the inner shroud. The grooves include entrances located in the third surface of the inner shroud and exits located in the second surface of the inner shroud, wherein the grooves are arranged such that a space having a component in a circumferential direction is defined between adjacent grooves. During operation of the engine, the grooves guide purge air out of the disc cavity toward the hot gas path such that a flow direction of the purge air is generally aligned with a direction of hot gas flow through the hot gas path, which is generally parallel to an exit angle of a trailing edge of at least one of the vanes.

In accordance with a third aspect of the invention, a seal assembly is provided between a disc cavity and a hot gas path that extends through a turbine section of a gas turbine engine. The seal assembly comprises a rotating blade assembly including a plurality of blades that rotate with a turbine rotor during operation of the engine, and a stationary vane assembly upstream from the blade assembly with respect to an inlet and an outlet of the turbine section. The vane assembly includes a plurality of vanes and an inner shroud comprising a radially outwardly facing first surface that extends to an axial end portion of the inner shroud, a second surface that extends from the axial end portion of the inner shroud away from the blade assembly and faces radially inwardly and axially, and a generally axially facing third surface that extends radially inwardly from the second surface and faces the blade assembly. The inner shroud further comprises a plurality of grooves extending into the inner shroud, the grooves including entrances located in the third surface of the inner shroud and exits located in the second surface of the inner shroud. The grooves are arranged such that a space having a component in a circumferential direction is defined between adjacent grooves, wherein the grooves are tapered from the entrances thereof to the exits thereof such that the entrances are wider than the exits and wherein the grooves are angled and/or curved in the circumferential direction such that the entrances thereof are located upstream from the exits thereof with reference to a direction of rotation of the turbine rotor. During operation of the engine, the grooves guide purge air out of the disc cavity toward the hot gas path such that a flow direction of the purge air is generally aligned with the direction of hot gas flow through the hot gas path.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of a preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
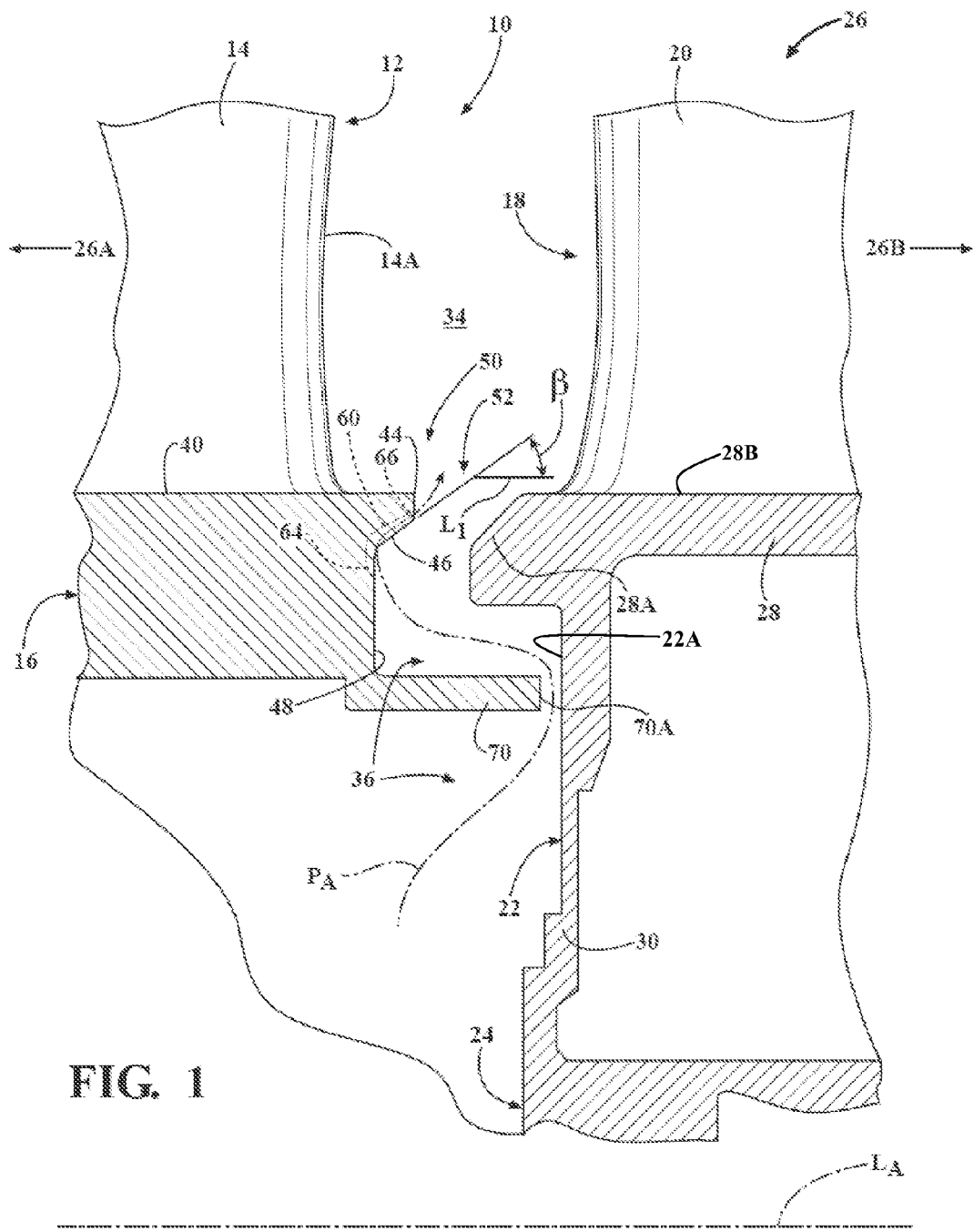
FIG. 1 is a diagrammatic sectional view of a portion of a turbine stage in a gas turbine engine including a seal assembly in accordance with an embodiment of the invention.

Referring to FIG. 1, a portion of a turbine engine 10 is illustrated diagrammatically including a stationary vane assembly 12 including a plurality of vanes 14 suspended from an outer casing (not shown) and affixed to an annular inner shroud 16, and a blade assembly 18 including a plurality of blades 20 and rotor disc structure 22 that forms a part of a turbine rotor 24. The vane assembly 12 and the blade assembly 18 may be collectively referred to herein as a "stage" of a turbine section 26 of the engine 10, which may include a plurality of stages as will be apparent to those having ordinary skill in the art. The vane assemblies 12 and blade assemblies 18 are spaced apart from one another in an axial direction defining a longitudinal axis $L_A$ of the engine 10, wherein the vane assembly 12 illustrated in FIG. 1 is upstream from the illustrated blade assembly 18 with respect to an inlet 26A and an outlet 26B of the turbine section 26, see FIGS. 1 and 3.

The rotor disc structure 22 may comprise a platform 28 including a radially outwardly facing surface 28B from which the blades 20 extend, a generally axially facing surface 22A located radially inwardly from the radially outwardly facing surface, a blade disc 30, and any other structure associated with the blade assembly 18 that rotates with the rotor 24 during operation of the engine 10, such as, for example, roots, side plates, shanks, etc.

The vanes 14 and the blades 20 extend into an annular hot gas path 34 defined within the turbine section 26. A working gas $H_G$ (see FIG. 3) comprising hot combustion gases is directed through the hot gas path 34 and flows past the vanes 14 and the blades 20 to remaining stages during operation of the engine 10. Passage of the working gas $H_G$ through the hot gas path 34 causes rotation of the blades 20 and the corresponding blade assembly 18 to provide rotation of the turbine rotor 24.

Referring to FIG. 1, a disc cavity 36 is located radially inwardly from the hot gas path 34 between the annular inner shroud 16 and the rotor disc structure 22. Purge air $P_A$, such as, for example, compressor discharge air, is provided into the disc cavity 36 to cool the inner shroud 16 and the rotor disc structure 22. The purge air $P_A$ also provides a pressure balance against the pressure of the working gas $H_G$ flowing through the hot gas path 34 to counteract a flow of the working gas $H_G$ into the disc cavity 36. The purge air $P_A$ may be provided to the disc cavity 36 from cooling passages (not shown) formed through the rotor 24 and/or from other upstream passages (not shown) as desired. It is noted that additional disc cavities (not shown) are typically provided between remaining inner shrouds 16 and corresponding adjacent rotor disc structures 22.

Figure 2:
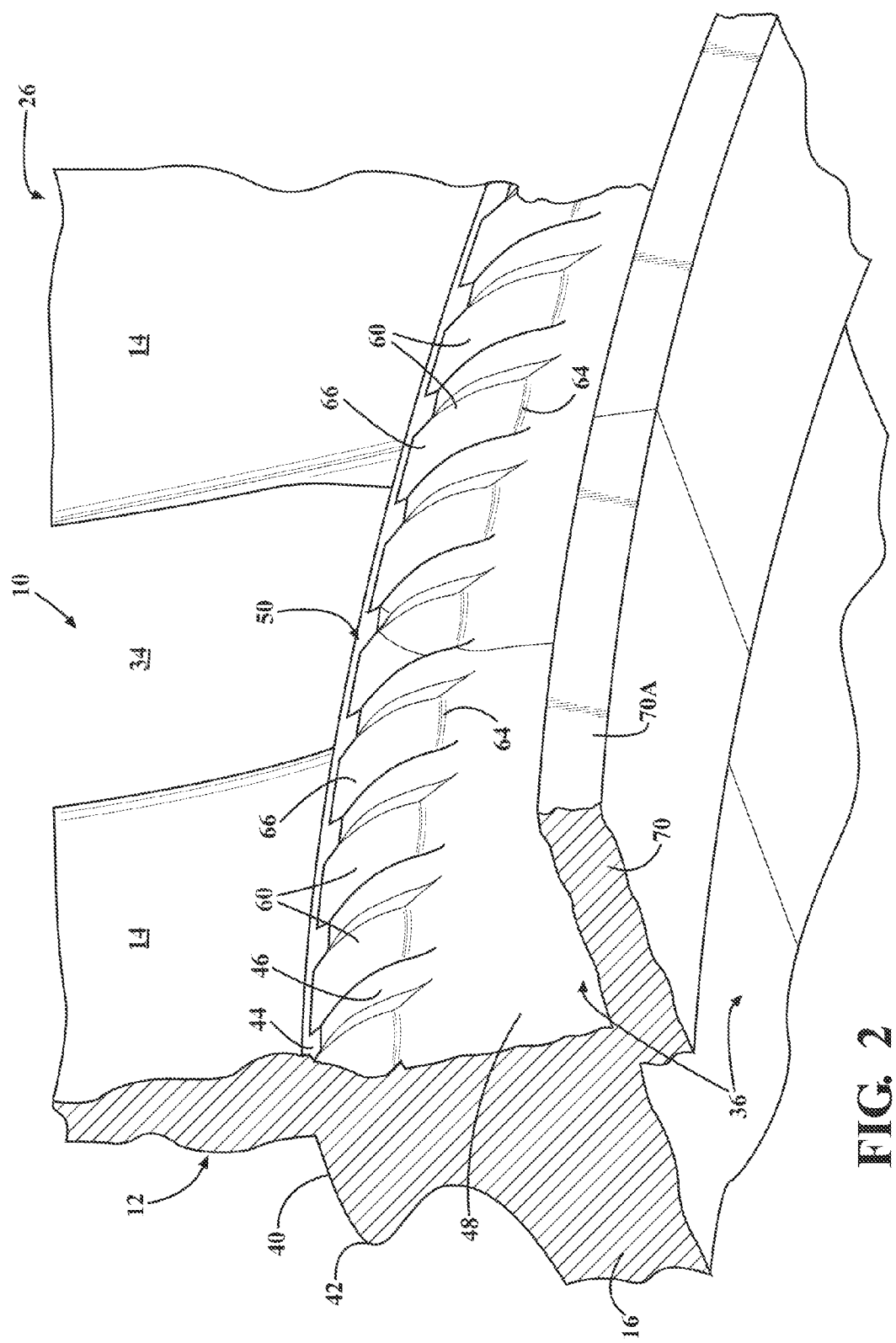
FIG. 2 is a fragmentary perspective view of a plurality of grooves of the seal assembly of FIG. 1.
Figure 3:
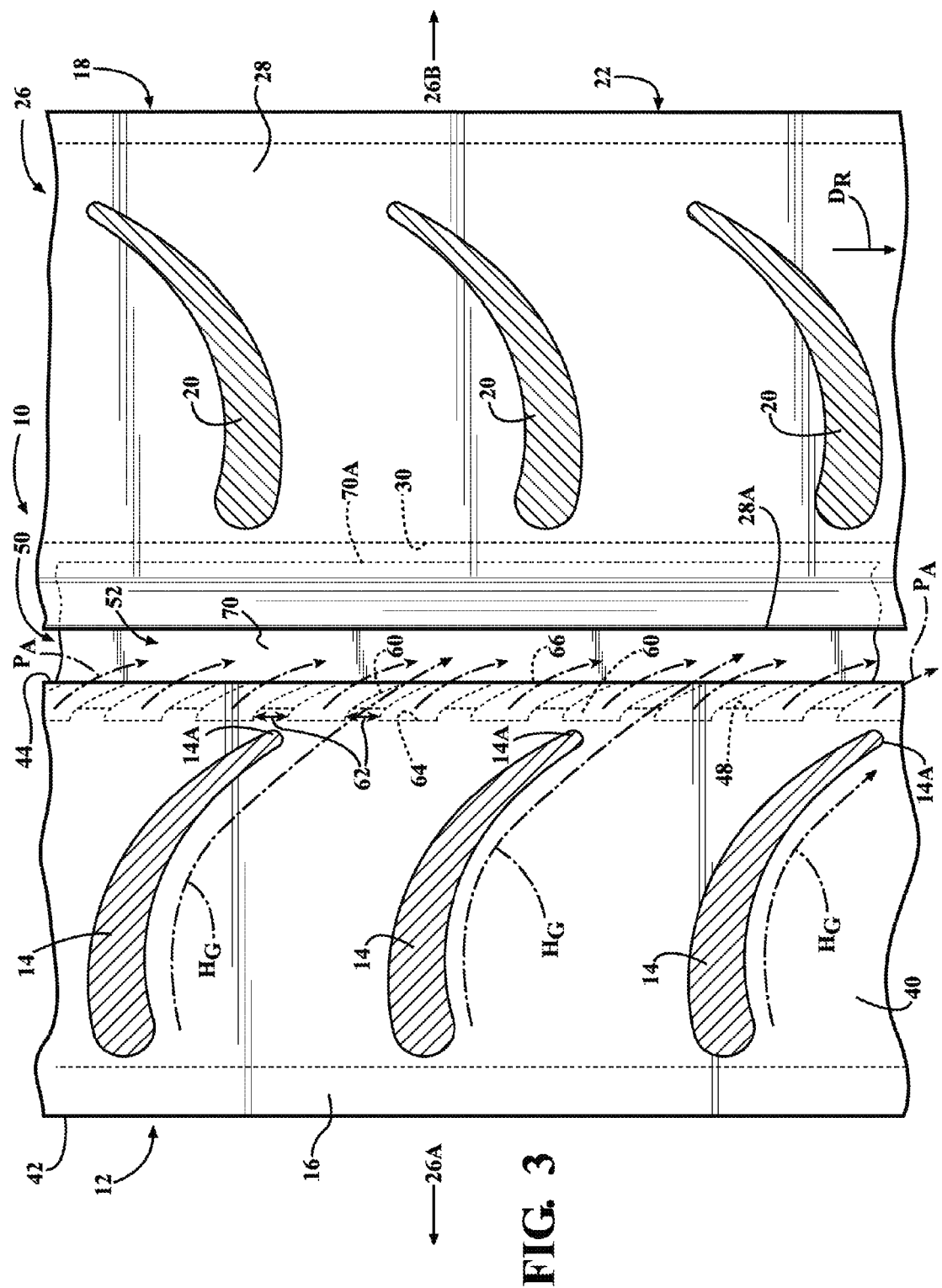
FIG. 3 is a cross sectional view of the stage illustrated in FIG. 1 looking in a radially inward direction.

As shown in FIGS. 1-3, the inner shroud 16 in the embodiment shown comprises a generally radially outwardly extending first surface 40 from which the vanes 14 extend. The first surface 40 in the embodiment shown extends from an axially upstream end portion 42 of the inner shroud 16 to an axially downstream end portion 44, see FIGS. 2 and 3. The inner shroud 16 further comprises a radially inwardly and axially facing second surface 46 that extends from the axially downstream end portion 44 of the inner shroud 16 away from the adjacent blade assembly 18 to a generally axially facing third surface 48 of the inner shroud 16, see FIGS. 1 and 2. The second surface 46 of the inner shroud 16 in the embodiment shown extends from the downstream end portion 44 at an angle β relative to a line L1 that is parallel to the longitudinal axis $L_A$, i.e., such that the second surface 46 also extends from the downstream end portion 44 at the angle β relative to the longitudinal axis $L_A$, which angle β is preferably between about 30-60° and is about 45° in the embodiment shown, see FIG. 1. The third surface 48 extends radially inwardly from the second surface 46 and faces the rotor disc structure 22 of the adjacent blade assembly 18.

Components of the inner shroud 16 and the rotor disc structure 22 radially inwardly from the respective vanes 14 and blades 20 cooperate to form an annular seal assembly 50 between the hot gas path 34 and the disc cavity 36. The annular seal assembly 50 assists in preventing ingestion of the working gas $H_G$ from the hot gas path 34 into the disc cavity 36 and delivers a portion of the purge air $P_A$ out of the disc cavity 36 in a desired direction with reference to a flow direction of the working gas $H_G$ through the hot gas path 34 as will be described herein. It is noted that additional seal assemblies 50 similar to the one described herein may be provided between the inner shrouds 16 and the adjacent rotor disc structures 22 of the remaining stages in the engine 10, i.e., for assisting in preventing ingestion of the working gas $H_G$ from the hot gas path 34 into the respective disc cavities 36 and to deliver purge air $P_A$ out of the disc cavities 36 in a desired direction with reference to the flow direction of the working gas $H_G$ through the hot gas path 34 as will be described herein.

As shown in FIGS. 1-3, the seal assembly 50 comprises portions of the vane and blade assemblies 12, 18. Specifically, in the embodiment shown, the seal assembly 50 comprises the second and third surfaces 46, 48 of the inner shroud 16 and an axially upstream end portion 28A of the platform 28 of the rotor disc structure 22. These components cooperate to define an outlet 52 for the purge air $P_A$ out of the disc cavity 36, see FIGS. 1 and 3.

The seal assembly 50 further comprises a plurality of grooves 60 extending into the second and third surfaces 46, 48 of the inner shroud 16. The grooves 60 are arranged such that spaces 62 having components in a circumferential direction are defined between adjacent grooves 60, see FIGS. 2 and 3. The size of the spaces 62 may vary depending on the particular configuration of the engine 10 and may be selected to fine tune discharging of purge air $P_A$ from the grooves 60, wherein the discharging of the purge air $P_A$ from the grooves 60 will be discussed in more detail below.

Figure 2A:
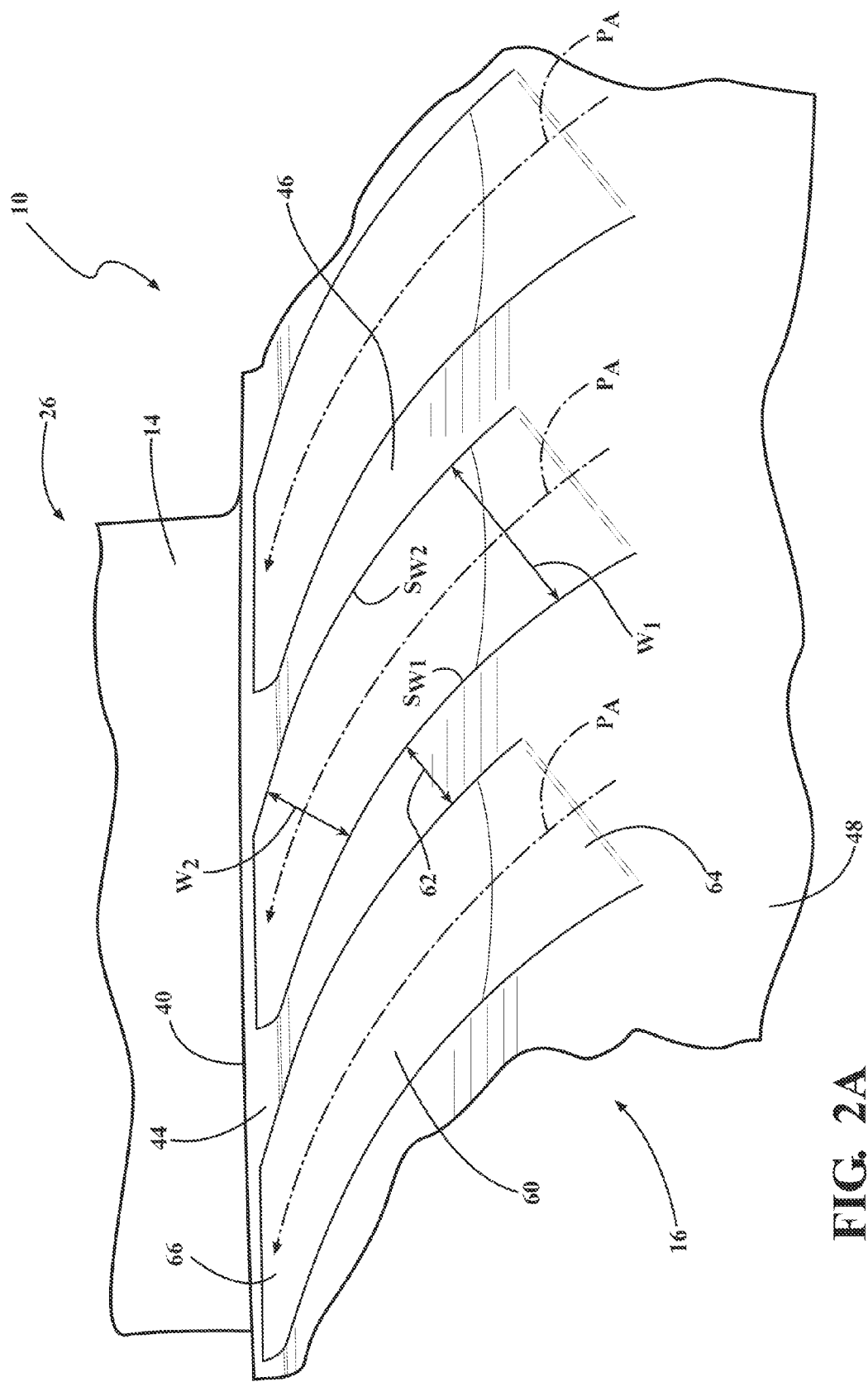
FIG. 2A is an elevational view of a number of the grooves illustrated in FIG. 2.

As shown most clearly in FIG. 2, entrances 64 of the grooves 60, i.e., where purge air $P_A$ from the disc cavity 36 to be discharged toward the hot gas path 34 enters the grooves 60, are located distal from the axial end portion 44 of the inner shroud 16 in the third surface 48 thereof, and exits 66 of the grooves 60, i.e., where the purge air $P_A$ is discharged from the grooves 60, are located proximal to the axial end portion 44 of the inner shroud 16 in the second surface 46 thereof. Referring to FIG. 2A, the grooves 60 are preferably tapered from the entrances 64 thereof to the exits 66 thereof such that widths $W_1$ of the entrances 64 are wider than widths $W_2$ of the exits 66, wherein the widths $W_1$, $W_2$ are respectively measured between opposing side walls $S_{W1}$, $S_{W2}$ of the inner shroud 16 that define the grooves 60 in directions substantially perpendicular to the general flow direction of the purge air $P_A$ through the respective grooves 60. The tapering of the grooves 60 in this manner is believed to provide a more concentrated and influential discharge of the purge air $P_A$ out of the grooves 60 so as to more effectively prevent ingestion of the working gas $H_G$ into the disc cavity 36 as will be described below.

As shown in FIG. 3, the grooves 60 are also preferably angled and/or curved in the circumferential direction such that the entrances 64 thereof are located upstream from the exits 66 thereof with reference to a direction of rotation $D_R$ of the turbine rotor 24. Angling and/or curving the grooves 60 in this manner effects a guidance of the purge air $P_A$ from the disc cavity 36 out of the grooves 60 toward the hot gas path 34 such that the purge air $P_A$ flows in a desired direction with reference to the flow of the working gas $H_G$ through the hot gas path 34. Specifically, the grooves 60 according to this aspect of the invention guide the purge air $P_A$ out of the disc cavity 36 such that a flow direction of the purge air $P_A$ is generally aligned with a flow direction of the working gas $H_G$ at a corresponding axial location of the hot gas path 34, which flow direction of the working gas $H_G$ at the corresponding axial location of the hot gas path 34 is generally parallel to exit angles of trailing edges 14A of the vanes 14.

Referring to FIGS. 1-3, the seal assembly 50 further comprises a generally axially extending seal structure 70 of the inner shroud 16 that extends from the third surface 48 thereof toward the blade disc 20 of the blade assembly 18. As shown in FIGS. 1 and 3, an axial end 70A of the seal structure 70 is in close proximity to the blade disc 20 of the blade assembly 18. The seal structure 70 may be formed as an integral part of the inner shroud 16, or may be formed separately from the inner shroud 16 and affixed thereto. As shown in FIG. 1, the seal structure 70 preferably overlaps the upstream end 28A of the platform 28 such that any ingestion from the hot gas path 34 into the disc cavity 36 must travel through a tortuous path.

During operation of the engine 10, passage of the hot working gas $H_G$ through the hot gas path 34 causes the blade assembly 18 and the turbine rotor 24 to rotate in the direction of rotation $D_R$ shown in FIG. 3.

A pressure differential between the disc cavity 36 and the hot gas path 34, i.e., the pressure in the disc cavity 36 is greater than the pressure in the hot gas path 34, causes purge air $P_A$ located in the disc cavity 36 to flow toward the hot gas path 34, see FIG. 1. As the purge air $P_A$ reaches the third surface 48 of the inner shroud 36, a portion of the purge air $P_A$ flows into the entrances 64 of the grooves 60. This portion of the purge air $P_A$ flows radially outwardly through the grooves 60 and then, upon reaching the portions of the grooves 60 within the second surface 46 of the inner shroud 16, the purge air $P_A$ flows radially outwardly and axially within the grooves 60 toward the adjacent blade assembly 18. Due to the angling and/or curving of the grooves 60 as discussed above, the purge air $P_A$ is provided with a circumferential velocity component such that the purge air $P_A$ is discharged out of the grooves 60 in generally the same direction as the working gas $H_G$ is flowing after exiting the trailing edges 14A of the vanes 14, see FIG. 3.

The discharge of the purge air $P_A$ from the grooves 60 assists in limiting ingestion of the hot working gas $H_G$ from the hot gas path 34 into the disc cavity 36 by forcing the working gas $H_G$ away from the seal assembly 50. Since the seal assembly 50 limits working gas $H_G$ ingestion from the hot gas path 34 into the disc cavity 36, the seal assembly 50 allows for a smaller amount of purge air $P_A$ to be provided to the disc cavity 36, thus increasing engine efficiency.

Moreover, since the purge air $P_A$ is discharged out of the grooves 60 in generally the same direction that the working gas $H_G$ flows through the hot gas path 34 after exiting the trailing edges 14A of the vanes 14, there is less pressure loss associated with the purge air $P_A$ mixing with the working gas $H_G$, thus additionally increasing engine efficiency. This is especially realized by the grooves 60 of the present invention since they are formed in the downstream end portion 44 of the inner shroud 16, such that the purge air $P_A$ discharged from the grooves 60 flows axially in the downstream flow direction of the hot working gas $H_G$ through the hot gas path 34, in addition to the purge air $P_A$ being discharged from the grooves 60 in generally the same circumferential direction as the flow of hot working gas $H_G$ after exiting the trailing edges 14A of the vanes 14, i.e., as a result of the grooves 60 being angled and/or curved in the circumferential direction. The grooves 60 formed in the inner shroud 16 are thus believed to provide less pressure loss associated with the purge air $P_A$ mixing with the working gas $H_G$ than if they were formed in the upstream end portion 28A of the platform 28, as purge air discharged out of grooves formed in the upstream end portion 28A of the platform 28 would flow axially upstream with regard to the flow direction of the hot working gas $H_G$ through the hot gas path 34, thus resulting in higher pressure losses associated with the mixing.

It is noted that the angle and/or curvature of the grooves 60 could be varied to fine tune the discharge direction of the purge air $P_A$ out of the grooves 60. This may be desirable based on the exit angles of trailing edges 14A of the vanes 14 and/or to vary the amount of pressure loss associated with the purge air $P_A$ mixing with the working gas $H_G$ flowing through the hot gas path 34.

Further, the entrances 64 of the grooves 60 could be located further radially inwardly or outwardly in the third surface 48 of the inner shroud 16, or the entrances 64 could be located in the second surface 46 of the inner shroud 16, i.e., such that the entireties of the grooves 60 would be located in the second surface 46 of the inner shroud 16.

Finally, the grooves 60 described herein are preferably cast with the inner shroud 16 or machined into the inner shroud 16. Hence, a structural integrity and a complexity of manufacture of the grooves 60 are believed to be improved over ribs that are formed separately from and affixed to the inner shroud 16.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly between a disc cavity and a hot gas path that extends through a turbine section of a gas turbine engine comprising:
    a rotating blade assembly including a plurality of blades that rotate with a turbine rotor during operation of the engine; and
    a stationary vane assembly including a plurality of vanes and an inner shroud, the inner shroud comprising:
        a radially outwardly facing first surface;
        a radially inwardly facing second surface; and
        a plurality of grooves extending into the second surface, the grooves being arranged such that a space having a component in a circumferential direction is defined between adjacent grooves, and wherein the grooves are tapered from entrances thereof located distal from an axial end portion of the inner shroud to exits thereof located proximal to the axial end portion of the inner shroud such that the entrances are wider than the exits;
    wherein, during operation of the engine, the grooves guide purge air out of the disc cavity toward the hot gas path such that the purge air flows in a desired direction with reference to a direction of hot gas flow through the hot gas path.

2. The seal assembly according to claim 1, wherein the second surface of the inner shroud faces radially inwardly from the axial end portion of the inner shroud at an angle relative to a longitudinal axis that extends axially through the turbine section such that the second surface of the inner shroud also faces in the axial direction.

3. The seal assembly according to claim 2, wherein the second surface of the inner shroud faces radially inwardly at an angle from the axial end portion of the inner shroud of about 30° to about 60° relative to the longitudinal axis.

4. The seal assembly according to claim 3, wherein the second surface of the inner shroud faces radially inwardly from the axial end portion of the inner shroud at an angle of about 45° relative to the longitudinal axis.

5. The seal assembly according to claim 1, wherein the grooves are at least one of angled and curved in the circumferential direction such that the entrances thereof located distal from the axial end portion of the inner shroud are located upstream from the exits thereof located proximal to the axial end portion of the inner shroud with reference to a direction of rotation of the turbine rotor.

6. The seal assembly according to claim 1, wherein the vanes are affixed to the first surface of the inner shroud.

7. The seal assembly according to claim 1, wherein the grooves guide the purge air such that a flow direction of the purge air is generally aligned with the direction of hot gas flow through the hot gas path, which is generally parallel to an exit angle of a trailing edge of at least one of the vanes.

8. The seal assembly according to claim 1, wherein the inner shroud further comprises a generally axially facing third surface that extends radially inwardly from the second surface and faces the blade assembly, wherein the entrances of the grooves are located in the third surface of the inner shroud and the exits of the grooves are located in the second surface of the inner shroud.

9. The seal assembly according to claim 8, wherein the inner shroud further comprises a generally axially extending seal structure that extends from the third surface of the inner shroud toward and within close proximity to the blade assembly.

10. A seal assembly between a disc cavity and a hot gas path that extends through a turbine section of a gas turbine engine comprising:
a rotating blade assembly including a plurality of blades that rotate with a turbine rotor during operation of the engine, a radially outwardly facing surface from which the blades extend, and a generally axially facing surface located radially inwardly from the radially outwardly facing surface; and
a stationary vane assembly including a plurality of vanes and an inner shroud, the inner shroud comprising:
a radially outwardly facing first surface that extends to an axial end portion of the inner shroud;
a second surface that extends from the axial end portion of the inner shroud away from the blade assembly and faces radially inwardly and axially; and
a generally axially facing third surface that extends radially inwardly from the second surface and faces the blade assembly; and
a plurality of grooves extending into the inner shroud, the grooves including entrances located in the third surface of the inner shroud and exits located in the second surface of the inner shroud, wherein the grooves are arranged such that a space having a component in a circumferential direction is defined between adjacent grooves;
a generally axially extending seal structure that extends from the third surface of the inner shroud toward and within close proximity to the generally axially facing surface of the blade assembly;

wherein, during operation of the engine, the grooves guide purge air out of the disc cavity toward the hot gas path such that a flow direction of the purge air is generally aligned with a direction of hot gas flow through the hot gas path, which is generally parallel to an exit angle of a trailing edge of at least one of the vanes.

11. The seal assembly according to claim 10, wherein the second surface of the inner shroud extends at an angle from the axial end portion of the inner shroud of about 30° to about 60° relative to the longitudinal axis.

12. The seal assembly according to claim 10, wherein at least one of:
the grooves are tapered from the entrances thereof to the exits thereof such that the entrances are wider than the exits; and
the grooves are at least one of angled and curved in the circumferential direction such that the entrances thereof are located upstream from the exits thereof with reference to a direction of rotation of the turbine rotor.

13. The seal assembly according to claim 10, wherein the vanes are affixed to the first surface of the inner shroud.

14. A seal assembly between a disc cavity and a hot gas path that extends through a turbine section of a gas turbine engine comprising:
a rotating blade assembly including a plurality of blades that rotate with a turbine rotor during operation of the engine; and
a stationary vane assembly upstream from the blade assembly with respect to an inlet and an outlet of the turbine section, the vane assembly including a plurality of vanes and an inner shroud, the inner shroud comprising:
a radially outwardly facing first surface that extends to an axial end portion of the inner shroud;
a second surface that extends from the axial end portion of the inner shroud away from the blade assembly and faces radially inwardly and axially; and
a generally axially facing third surface that extends radially inwardly from the second surface and faces the blade assembly; and
a plurality of grooves extending into the inner shroud, the grooves including entrances located in the third surface of the inner shroud and exits located in the second surface of the inner shroud, wherein:
the grooves are arranged such that a space having a component in a circumferential direction is defined between adjacent grooves;
the grooves are tapered from the entrances thereof to the exits thereof such that the entrances are wider than the exits; and
the grooves are at least one of angled and curved in the circumferential direction such that the entrances thereof are located upstream from the exits thereof with reference to a direction of rotation of the turbine rotor;
wherein, during operation of the engine, the grooves guide purge air out of the disc cavity toward the hot gas path such that a flow direction of the purge air is generally aligned with the direction of hot gas flow through the hot gas path.

15. The seal assembly according to claim 14, wherein the second surface of the inner shroud extends at an angle from the axial end portion of the inner shroud of about 30° to about 60° relative to the longitudinal axis.

16. The seal assembly according to claim 15, wherein the inner shroud further comprises a generally axially extending seal structure that extends from the third surface of the inner shroud toward and within close proximity to the blade assembly.

17. The seal assembly according to claim 16, wherein the direction of hot gas flow through the hot gas path is generally parallel to an exit angle of a trailing edge of at least one of the vanes.

18. The seal assembly according to claim 15, wherein the vanes are affixed to the first surface of the inner shroud.

* * * * *